(12) United States Patent
Tokonami et al.

(10) Patent No.: US 10,432,813 B2
(45) Date of Patent: Oct. 1, 2019

(54) IMAGE READING DEVICE THAT READS DOCUMENT IMAGE

(71) Applicant: KYOCERA Document Solutions Inc., Osaka (JP)

(72) Inventors: Minoru Tokonami, Osaka (JP); Yoshihiko Kurotsu, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 20 days.

(21) Appl. No.: 15/845,388

(22) Filed: Dec. 18, 2017

(65) Prior Publication Data

US 2018/0176395 A1    Jun. 21, 2018

(30) Foreign Application Priority Data

Dec. 21, 2016 (JP) ................................. 2016-248483

(51) Int. Cl.
*H04N 1/00* (2006.01)
*H04N 1/10* (2006.01)
(Continued)

(52) U.S. Cl.
CPC ........... *H04N 1/0083* (2013.01); *H04N 1/103* (2013.01); *H04N 1/1017* (2013.01);
(Continued)

(58) Field of Classification Search
CPC .......................... H04N 1/0083; H04N 1/1017
See application file for complete search history.

(56) References Cited

U.S. PATENT DOCUMENTS 5,434,743 A * 7/1995 Hosoya ................. G06F 1/1616
361/679.32
5,985,451 A * 11/1999 Senda ................... B60T 11/236
228/199

(Continued)

FOREIGN PATENT DOCUMENTS

JP    H07-193689 A    7/1995
JP    H08-062737 A    3/1996
(Continued)

OTHER PUBLICATIONS

Notice of Reasons for Refusal dated Jun. 25, 2019 mailed in the corresponding Japanese Patent Application No. 2016-248483.

*Primary Examiner* — Ibrahim Siddo
(74) *Attorney, Agent, or Firm* — IP Business Solutions, LLC

(57) ABSTRACT

An image reading device includes a contact plate, a frame, a carriage, and a flexible flat cable. The carriage includes a reading mechanism and a resin-made slider projectedly provided at both end portions of the reading mechanism in its extending direction, and reciprocally moves in a sub-scanning direction at a bottom surface side of the contact plate while the slider slides the bottom surface of the contact plate in the frame. The flexible flat cable is connected to an one side surface of the carriage so that a width direction thereof matches the main-scanning direction, is arranged so that a part continued from a portion where the flexible flat cable connects with the one side surface is curved in a U-shape to go around toward an underside of the carriage, and transmits an electric signal of the reading mechanism. The contact plate is applied with a fluorine coating.

7 Claims, 14 Drawing Sheets

(51) Int. Cl.
*H04N 1/193* (2006.01)
*H04N 1/12* (2006.01)

(52) U.S. Cl.
CPC ......... *H04N 1/1065* (2013.01); *H04N 1/1225* (2013.01); *H04N 1/1934* (2013.01); *H04N 2201/0094* (2013.01)

(56) References Cited

U.S. PATENT DOCUMENTS

| | | | |
|---|---|---|---|
| 2007/0047023 A1 | 3/2007 | Oguri et al. | |
| 2009/0244655 A1* | 10/2009 | Mukai | H04N 1/0083 358/474 |
| 2016/0150107 A1 | 5/2016 | Ninomiya | |

FOREIGN PATENT DOCUMENTS

| | | |
|---|---|---|
| JP | 2004-104392 A | 4/2004 |
| JP | 2005-115031 A | 4/2005 |
| JP | 2007-067810 A | 3/2007 |
| JP | 2010-093645 A | 4/2010 |
| WO | 2015080121 A1 | 3/2017 |

\* cited by examiner

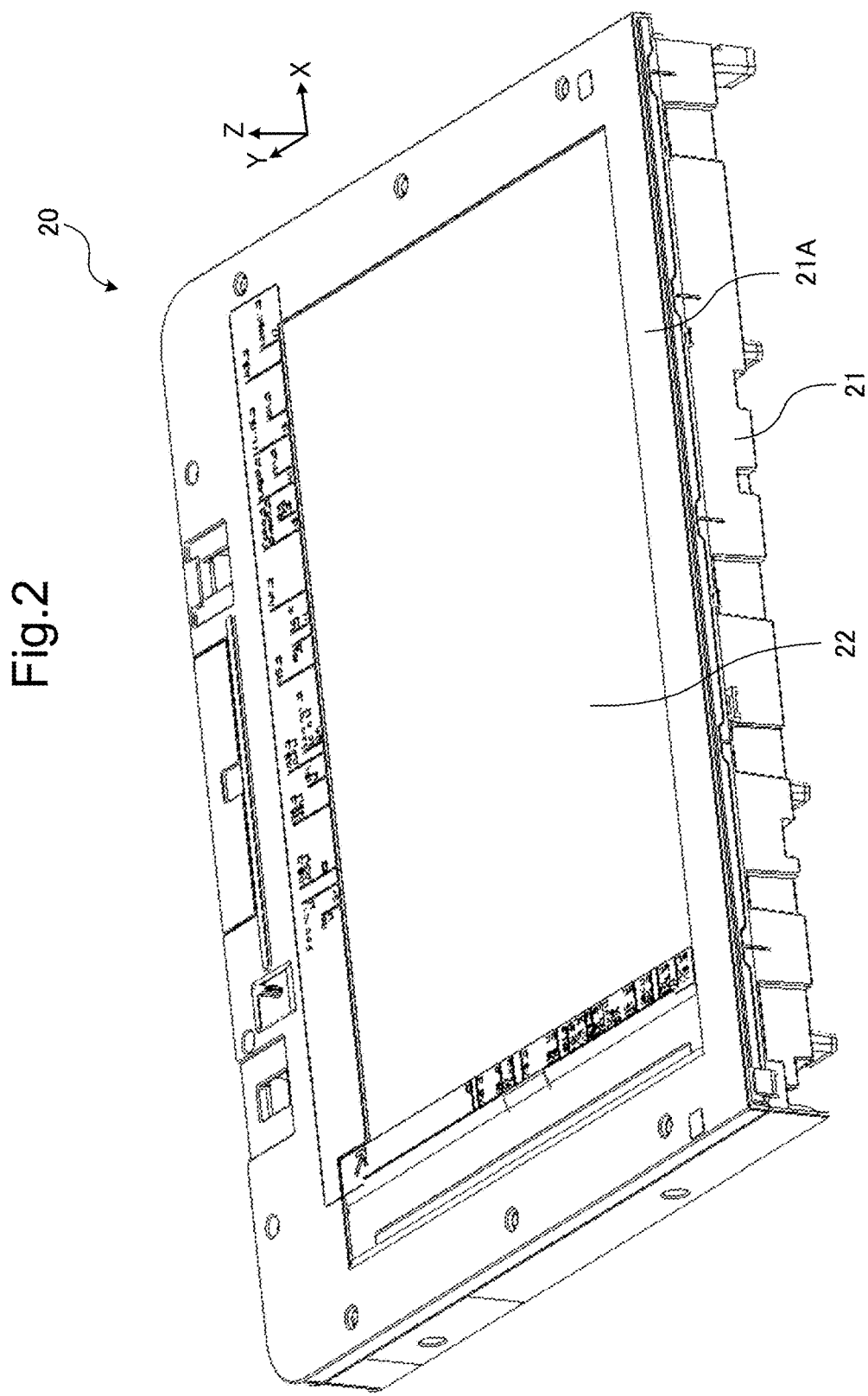

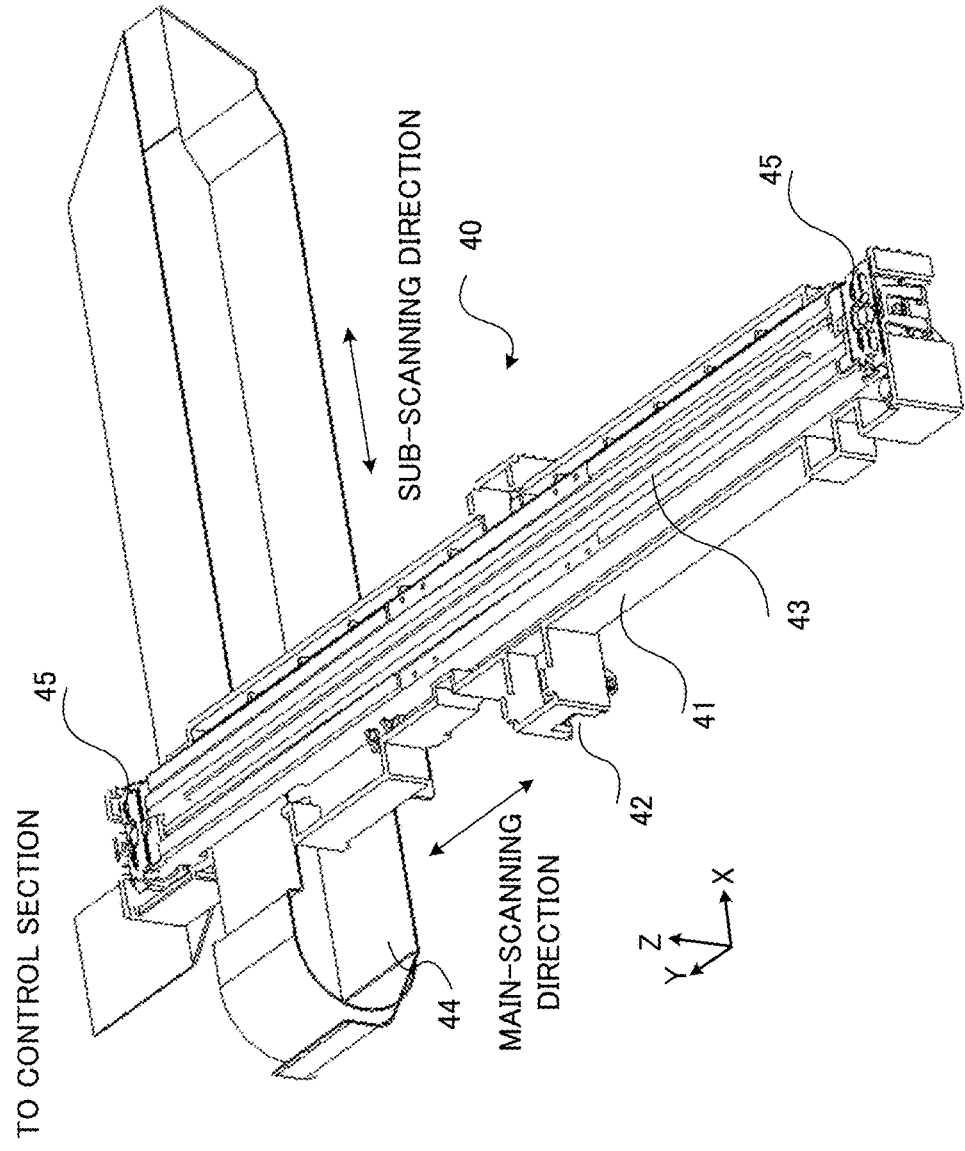

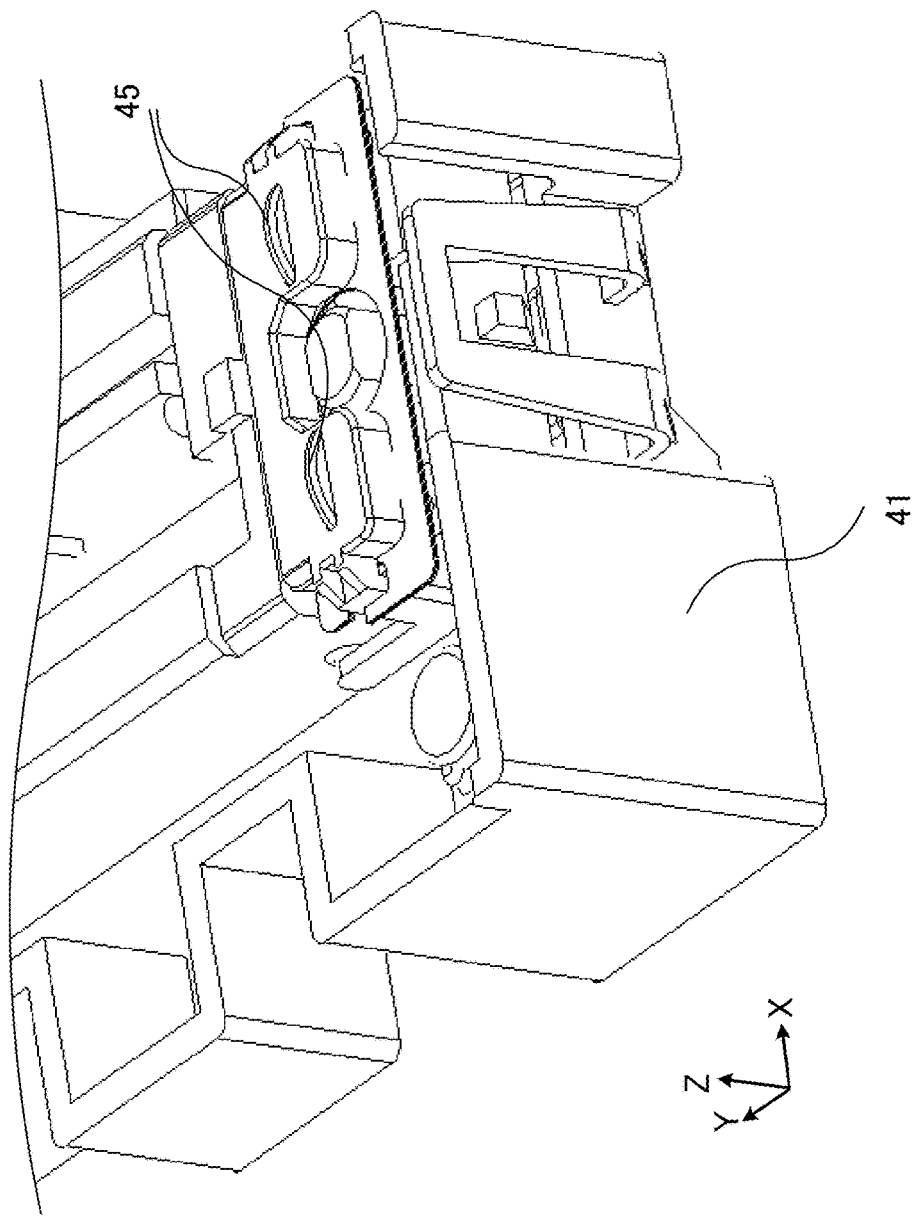

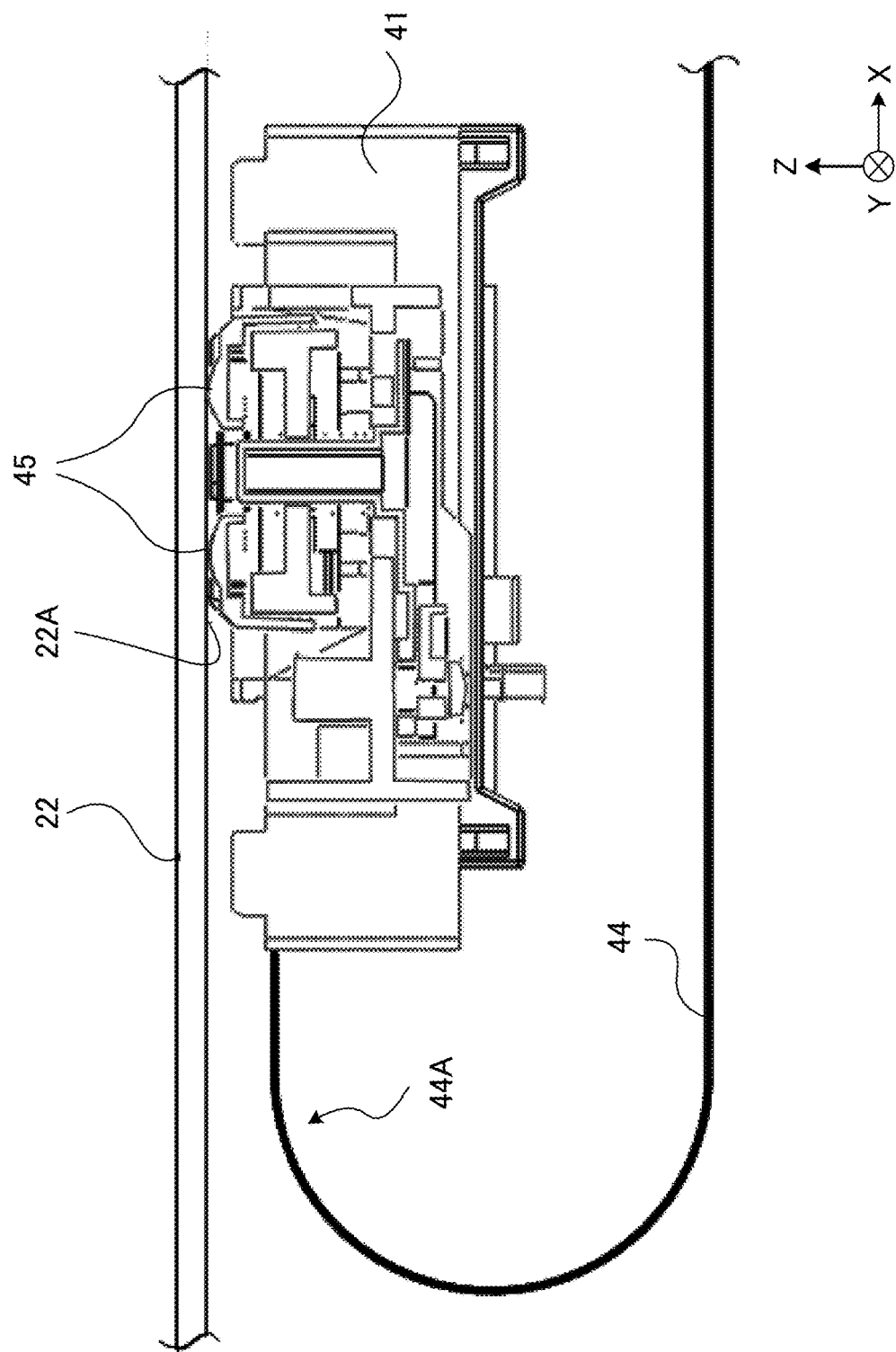

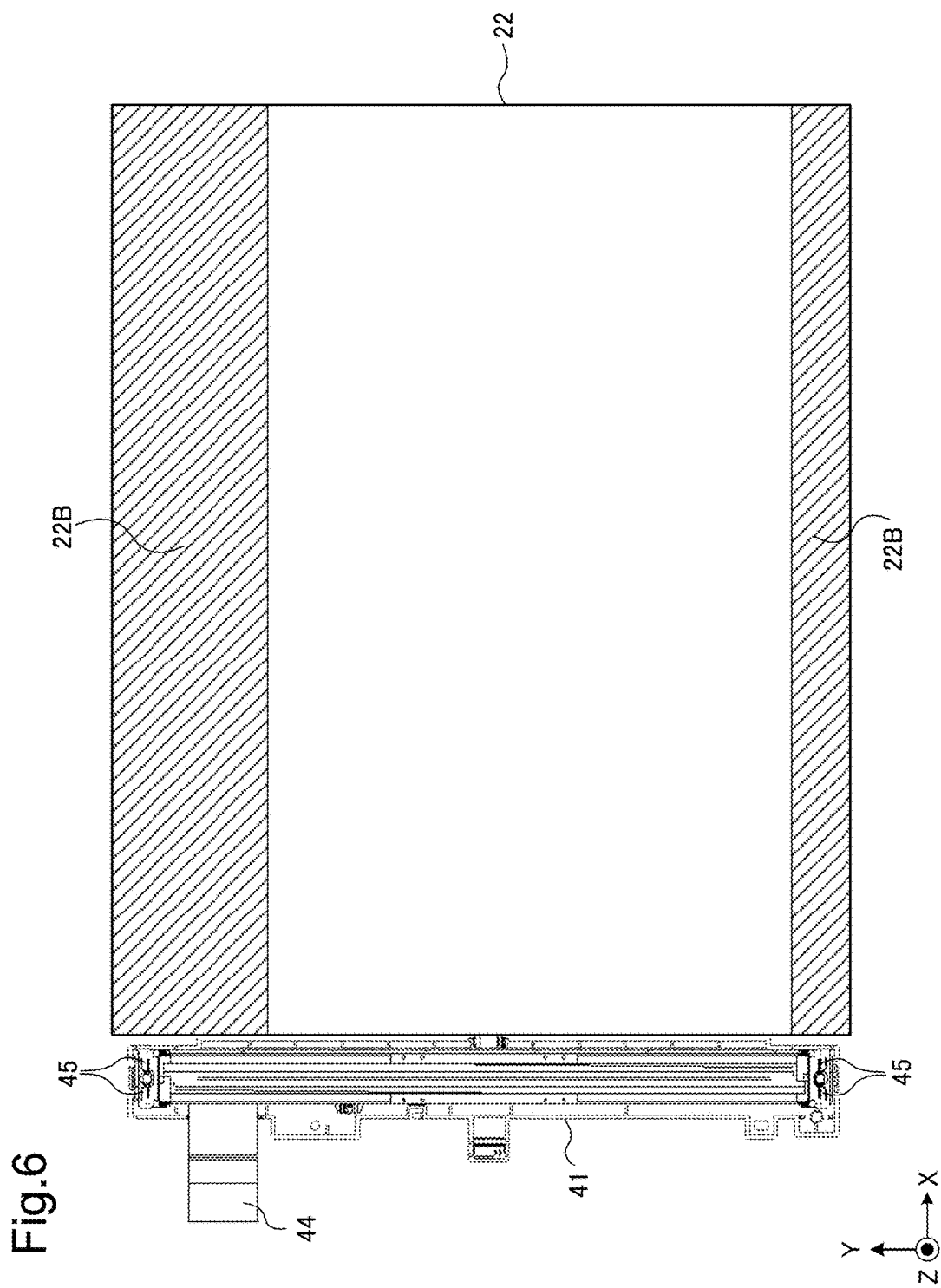

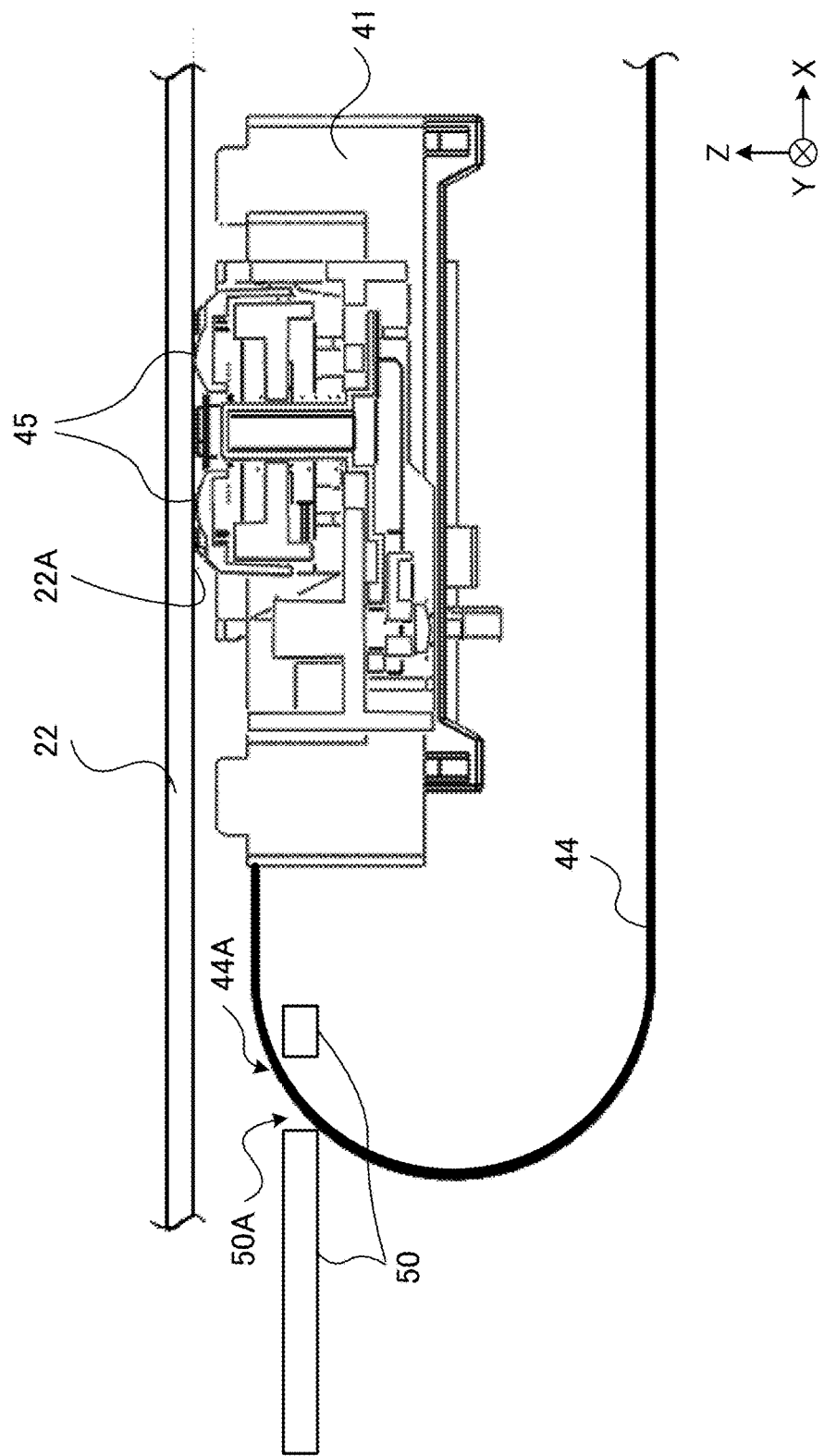

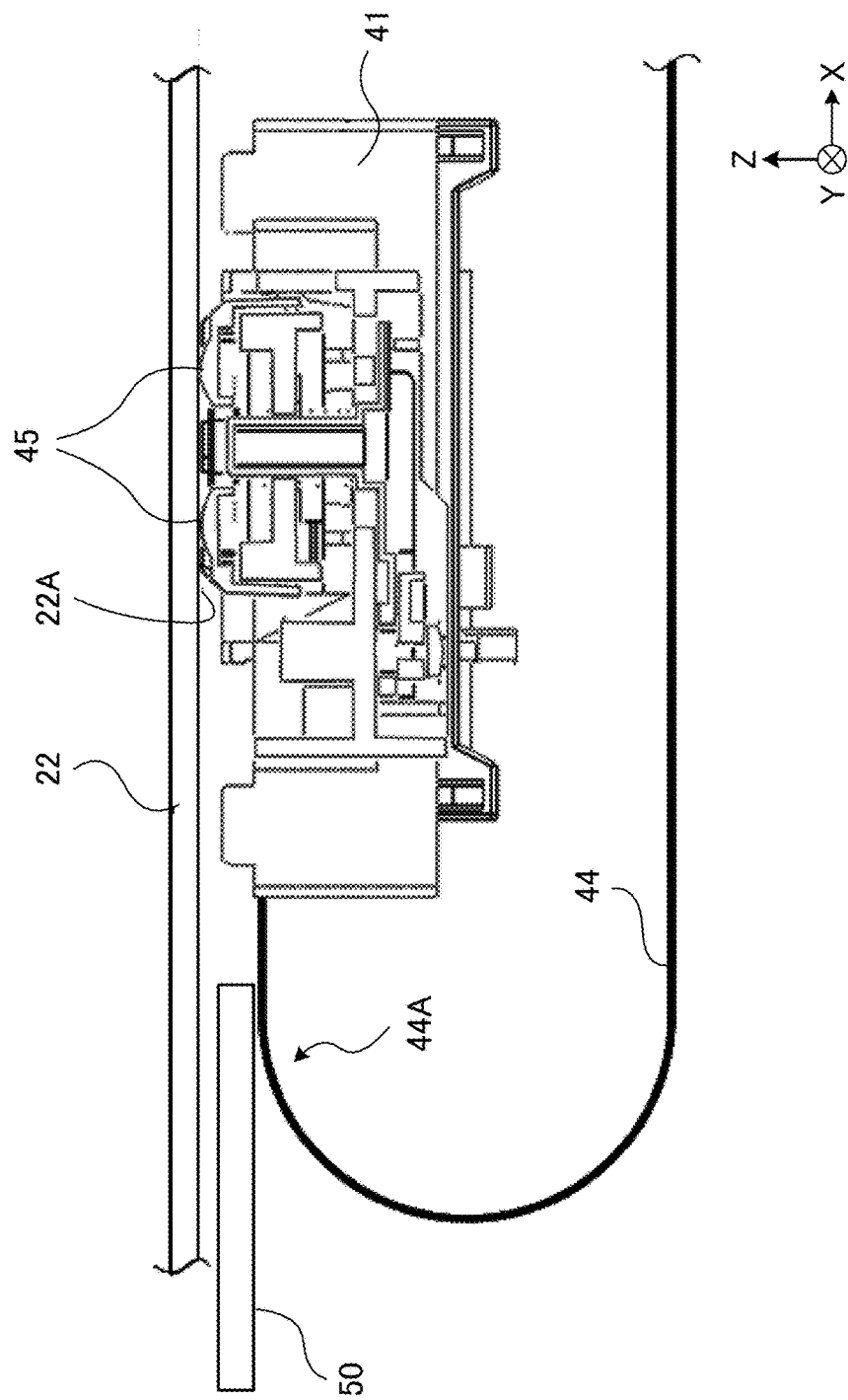

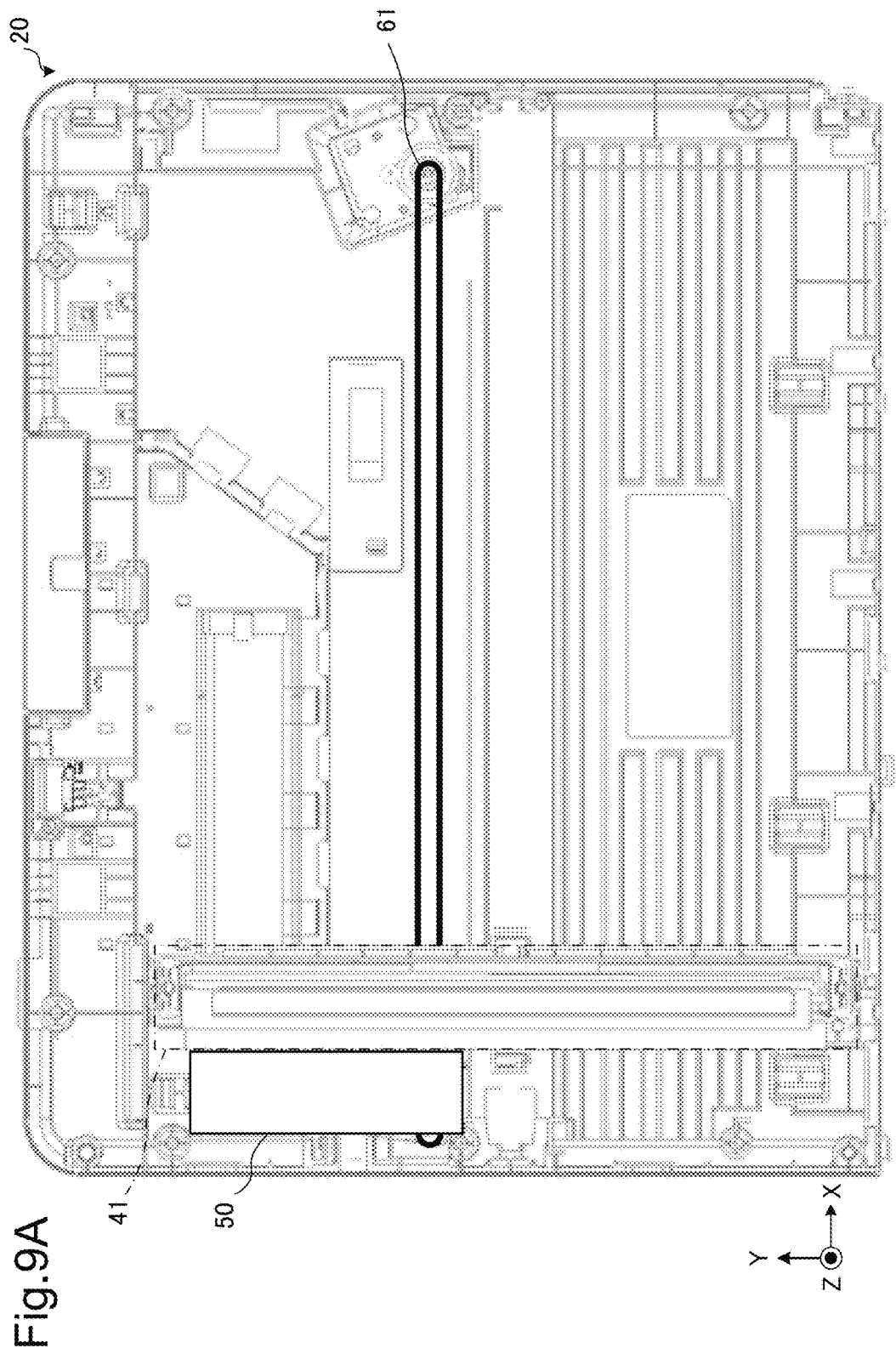

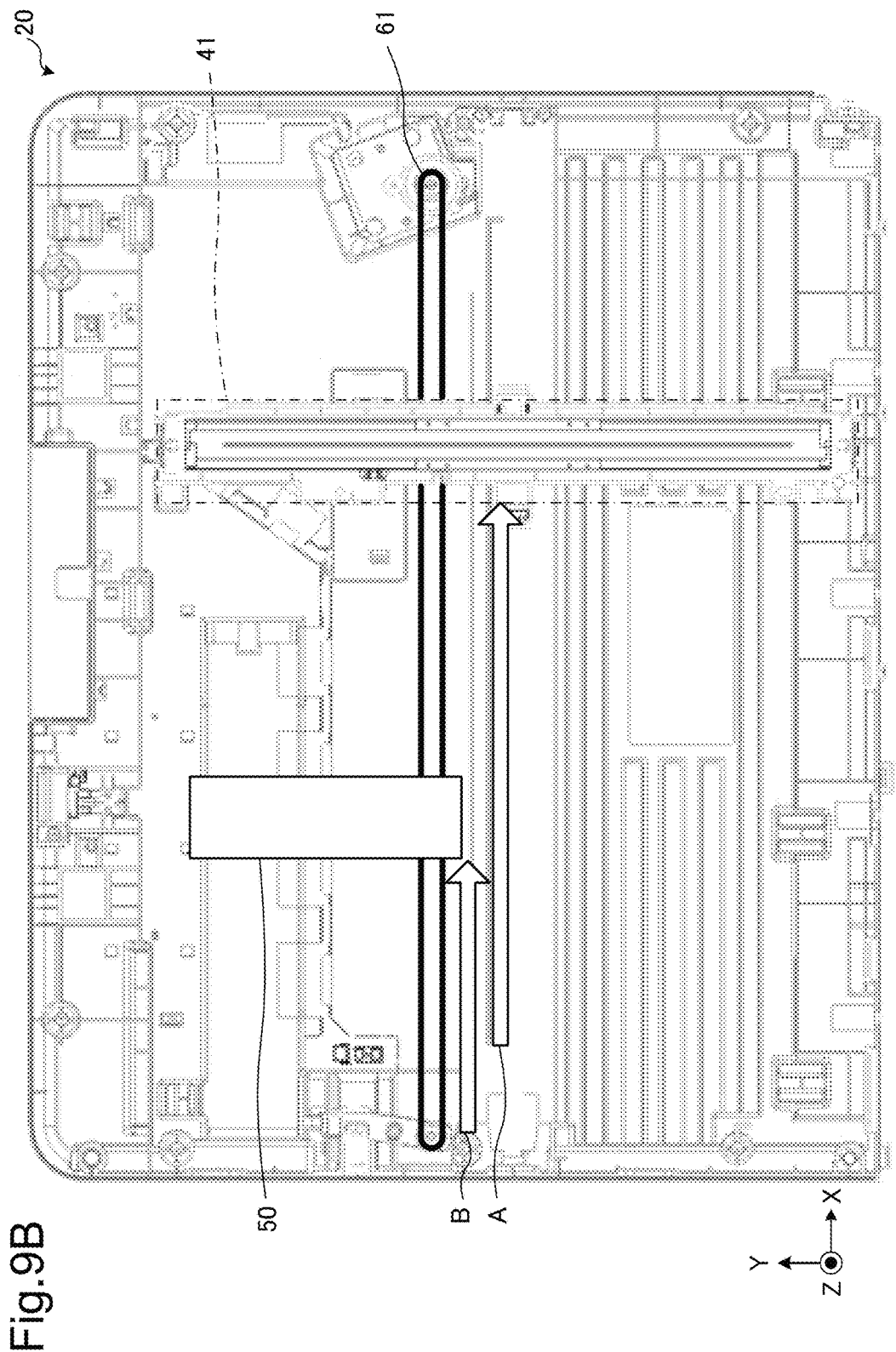

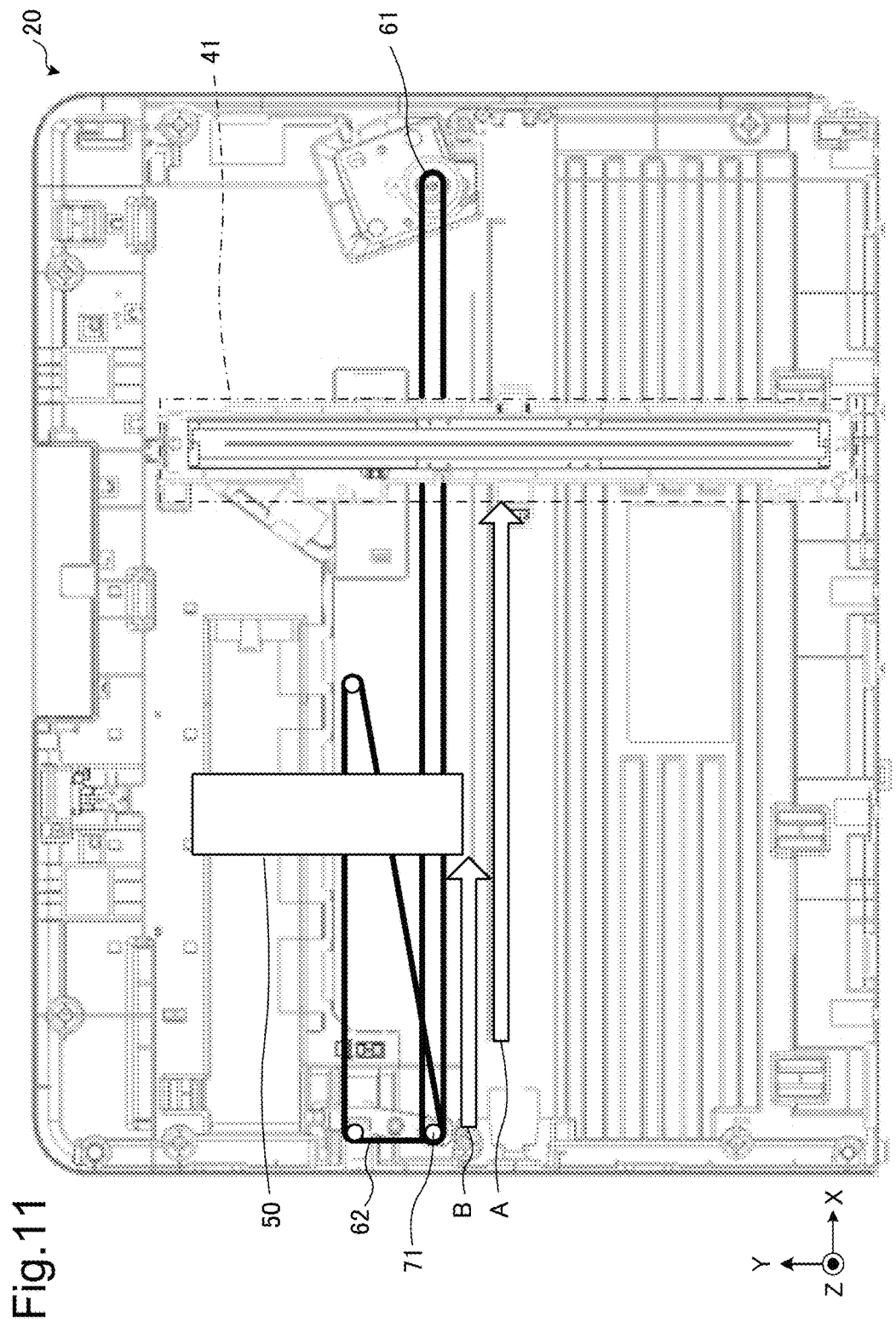

IMAGE READING DEVICE THAT READS DOCUMENT IMAGE

INCORPORATION BY REFERENCE

This application claims priority to Japanese Patent Application No. 2016-248483 filed on Dec. 21, 2016, the entire contents of which are incorporated by reference herein.

BACKGROUND

The present disclosure relates to image reading devices, and more specifically, to a technique for preventing occurrence of a stain on the contact plate.

There is a contact image sensor (CIS) type image reading device in image reading devices that optically read images from documents. The CIS type image reading device reads an image of a document placed on a contact plate by reciprocating a carriage (scanner unit) in a sub-scanning direction, the carriage including a reading mechanism extending in a main-scanning direction.

In the CIS type image reading device, a flexible flat cable (FFC) having strong bend-resistance is connected to the carriage, and through the FFC, communication is performed between the reading mechanism included in the carriage and a device body. The FFC is connected to an one side surface of the carriage so that a width direction thereof matches the main-scanning direction, and is arranged so that a part continued from a portion where the FFC connects with the one side surface is curved in a U-shape to go around toward an underside of the carriage. Such the arrangement of the FFC allows, when the carriage is reciprocally moving, an arbitrary part of the FFC to curve in association with the movement, thereby preventing the FFC to hindering the image reading operation.

In association with the reciprocating movement of the carriage, the FFC in some cases deforms and comes into contact with the contact plate. When the FFC comes into contact with the contact plate, the contact plate may be stained. In addition, if the FFC is adhered to the contact plate by static electricity, torque fluctuation may be caused while the carriage is moving, and image reading abnormality might occur.

To prevent the FFC from coming into contact with the contact plate, there is a technique of forming in a frame a recess part that can store the FFC.

SUMMARY

A technique improved over the aforementioned technique is proposed as one aspect of the present disclosure.

An image reading device according to an aspect of the present disclosure includes a contact plate, a frame, a carriage, and a flexible flat cable.

The contact plate is where a document to be read is placed on.

The frame is of box-shape and supports the contact plate.

The carriage includes a reading mechanism extending in a main-scanning direction and a resin-made slider projectedly provided at both end portions of the reading mechanism in an extending direction thereof and, while the slider slides a bottom surface of the contact plate in the frame, reciprocally moves in a sub-scanning direction at a side of the bottom surface. The bottom surface is an opposite side from a top surface on which the document is placed.

The flexible flat cable is connected to an one side surface of the carriage so that a width direction thereof matches the main-scanning direction, and is arranged so that a part continued from a portion where the flexible flat cable connects with the one side surface is curved in a U-shape to go around toward an underside of the carriage. The flexible flat cable transmits an electric signal of the reading mechanism.

The bottom surface of the contact plate is applied with a fluorine coating.

An image reading device according to another aspect of the present disclosure includes a contact plate, a frame, a carriage, and a flexible flat cable.

The contact plate is where a document to be read is placed on.

The frame is of box-shape and supports the contact plate.

The carriage includes a reading mechanism extending in a main-scanning direction and reciprocally moves in a sub-scanning direction at a side of a bottom surface of the contact plate in the frame. The bottom surface is an opposite side from a top surface on which the document is placed.

The flexible flat cable is connected to an one side surface of the carriage so that a width direction thereof matches the main-scanning direction, and is arranged so that a part continued from a portion where the flexible flat cable connects with the one side surface is curved in a U-shape to go around toward an underside of the carriage. The flexible flat cable transmits an electric signal of the reading mechanism.

The cable guide unit guides a U-shaped curved portion of the flexible flat cable and avoids the flexible flat cable from coming into contact with the contact plate while reciprocally moving in the sub-scanning direction by following the carriage at a speed slower than a moving speed of the carriage. The U-shaped curved portion moves along with a move of the carriage.

BRIEF DESCRIPTION OF THE DRAWINGS

FIG. 2 is a perspective view showing the image reading device according the one embodiment of the present disclosure.

FIG. 3 is a perspective view showing a scanner according the one embodiment of the present disclosure.

FIG. 4 is an enlarged perspective view showing a one-end part of a carriage.

FIG. 5 is a sectional view showing the carriage, a flexible flat cable (FFC), and a contact plate.

FIG. 6 is a plane view showing the contact plate to which a fluorine coating is applied.

FIG. 7 is a cross sectional view showing a cable guide unit, the carriage, the FFC, and the contact plate according to one example.

FIG. 8 is a cross sectional view showing the cable guide unit, the carriage, the FFC, and the contact plate according to another example.

FIG. 9A is a plane view showing an inside of the image reading device when the carriage and the cable guide unit are at a home position.

FIG. 9B is a plane view showing the inside of the image reading device when the carriage and the cable guide unit are moving.

FIG. 11 is a plane view showing the inside of the image reading device including two timing belts each of which reciprocates the carriage and the cable guide unit respectively.

DETAILED DESCRIPTION

Hereinafter, an image reading device according to one embodiment as one aspect of the present disclosure will be described with reference to the drawings. The drawings include an annotation of three axes of X, Y, and Z: an X-direction, a Y-direction, and a Z-direction respectively represent the horizontal direction, the front-back direction, and the vertical direction of the image reading device.

Figure 1:
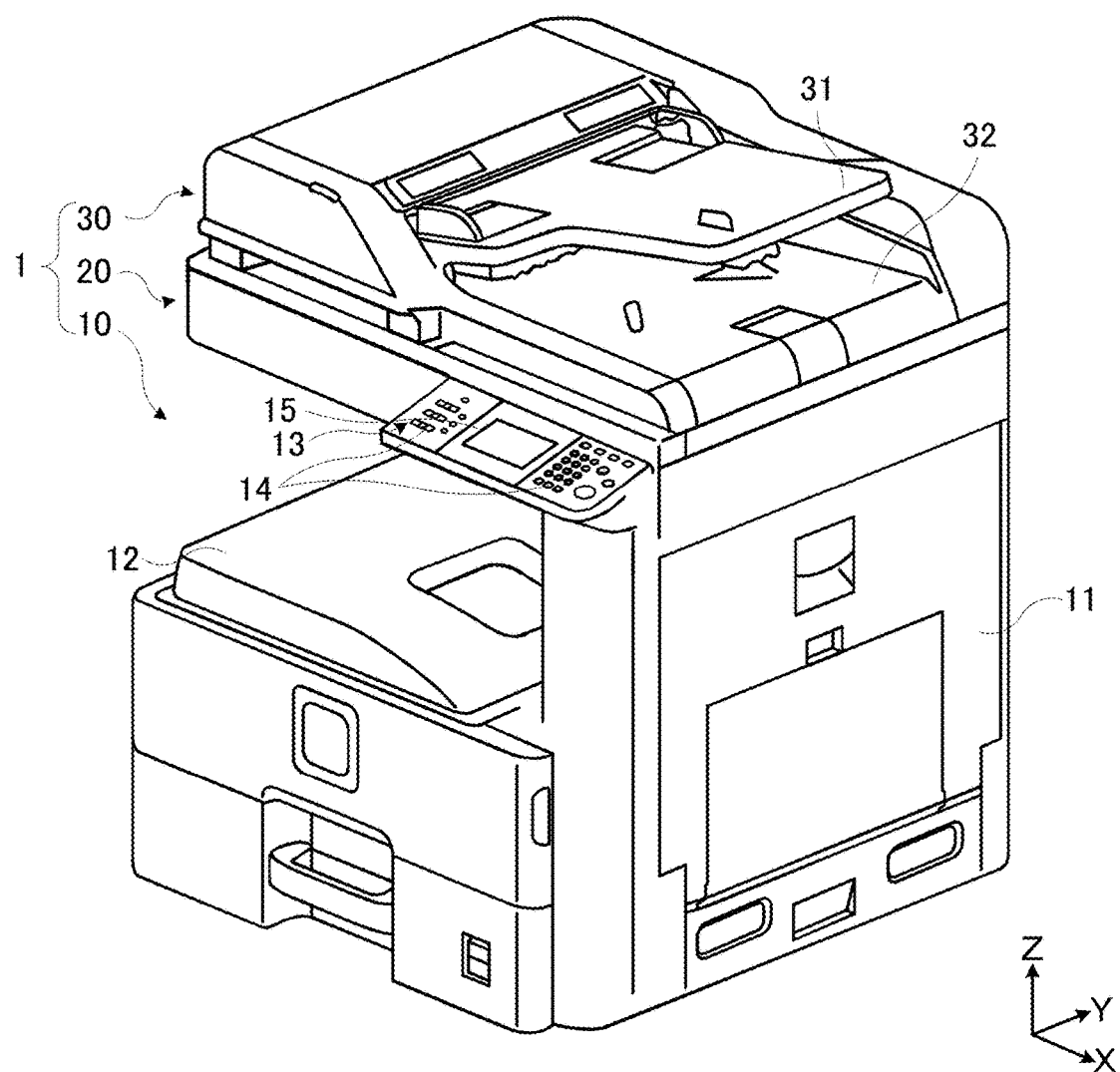
FIG. 1 is a perspective view showing an image forming apparatus having an image reading device according one embodiment of the present disclosure.

FIG. 1 is a perspective view showing an image forming apparatus having the image reading device according the one embodiment of the present disclosure. As illustrated in FIG. 1, an image forming apparatus 1 is roughly constituted of a device body 10, an image reading device 20 provided above the device body 10, and a document conveyance device 30 provided above the image reading device 20.

Sections such as an unillustrated image forming section are housed in a housing 11 forming an outer shell of the device body 10. The image forming section includes a photosensitive drum, a charging device, an exposure device, a developing device, and so forth (all not illustrated). A toner image of a document read by the image reading device 20 is formed on the photosensitive drum through each charging, exposing, and developing process. Thereafter, the image forming section transfers the toner image onto a recording sheet and after applying a fixing process, discharges the recording sheet to a discharge tray 12.

An operation section 13 is arranged on a front side of the housing 11 of the device body 10. The operation section 13 has a display section 15 that is formed with a plurality of operation keys 14, such as a start key for instructing execution of an image reading job, and with a liquid crystal display (LCD) or an organic light-emitting diode (OLED) display.

The document conveyance device 30 conveys the document placed on a document placing table 31 to a contact plate (not shown) of the image reading device 20. The document conveyed to the contact plate is read by an unillustrated scanner at a predetermined position, then discharged to a document discharge part 32. The contact plate and the scanner will be detailed later on with reference to the drawings.

The document conveyance device 30 is provided openably and closably with respect to a principal surface of the contact plate 22, and serves as a document retaining member for retaining the document placed on the contact plate 22.

FIG. 2 is a perspective view showing the image reading device 20 according the one embodiment of the present disclosure. As illustrated in FIG. 2, the image reading device 20 has a box-shaped frame 21. At an upper surface 21A of the frame 21, that is, at a surface that comes to an opposing position to the document conveyance device 30 when the document conveyance device 30 is closed, an opening is provided. The contact plate 22 is mounted on the opening.

A scanner is provided at a side of a bottom surface that is an opposite side from a top surface in the contact plate 22 where the document is placed on. The scanner reciprocally moves in a sub-scanning direction (a direction orthogonal to a main-scanning direction), in other words, the X-direction shown in the drawing, and reads the document to be read being placed on the contact plate 22.

FIG. 3 is a perspective view showing the scanner 40. The scanner 40 includes a carriage 41 that extends in the main-scanning direction, in other words, in the Y-direction shown in the drawing. The carriage 41 is provided with a groove part 42 formed astride an unillustrated rail provided inside the frame 21 of the image reading device 20. The rail extends in the sub-scanning direction inside the frame 21, and the carriage 41 is driven to reciprocally move in the sub-scanning direction along the rail by an unillustrated drive section formed with a motor, a gear, and so forth while the groove part 42 is in a state being astride the rail.

The carriage 41 includes a reading mechanism 43 that extends in the main-scanning direction. The reading mechanism 43 includes: an unillustrated light emitting section, which includes a plurality of light emitting diodes (LEDs) such as a red LED, a green LED, and a blue LED; and an unillustrated light receiving section such as a complementary metal oxide semiconductor (CMOS) image sensor. The reading mechanism 43, from the light emitting section, irradiates a light toward the document to be read while switching the light of three colors of red, green and blue, and at the light receiving section, receives the reflected light reflected from the document. The light receiving section converts the received light to an electric signal and obtains a one-line image data of the main-scanning direction.

Through a flexible flat cable (hereinafter referred to as FFC) 44, the reading mechanism 43 is electrically connected to an unillustrated control section that controls image reading operation. The control section includes a control unit formed with a central processing unit (CPU), a random access memory (RAM), a read only memory (ROM), and so forth, and a hardware circuit such as an analog and digital conversion circuit. The image data obtained by the reading mechanism 43 is transmitted to the control section through the FFC 44, and various kinds of image processing, such as digital signaling, a shading correction, a gamma correction, a chromatic aberration correction, a modulation transfer function (MTF) correction, and a scanner color correction, are applied at the control section. The image data generated by the image processing is stored in a storage section, such as an unillustrated built-in image memory and an HDD.

Not only the above-described image data, the FFC 44 transmits, for example, electric power for driving the carriage 41 and control signal for controlling the image reading operation of the reading mechanism 43.

The FFC 44 is a ribbon-shaped cable in which a plurality of conductors lined up with regular intervals is covered with a resin film. The FFC 44 has a characteristic capable of maintaining an electrical characteristic even if it is deformed, and thus suited for a cable connecting to the carriage 41 that reciprocally moves. A socket that fits to a cable-opening is provided at one end of the FFC 44. The cable-opening is provided at one side surface of the carriage 41 and extends in the main-scanning direction. At the other end of the FFC 44, a socket that fits to an unillustrated pin header arranged on the control section. Thus, the FFC 44 is arranged inside of the frame 21 in a state such that a part continued from a portion where the FFC 44 connects with the one side surface of the carriage 41 is curved in a U-shape to go around toward an underside of the carriage 41.

In other words, the one-end part of the FFC 44 is connected to the one side surface of the carriage 41. The FFC 44 extends to a direction away from the carriage 41 with the one-end part as a starting point, is curved in the U-shape, then extends in a reverse direction to go around toward the underside of the carriage 41. Furthermore, the FFC 44 is reversed in a folded state at a position opposing, with the carriage 41 in between, from a position where the FFC 44 is curved in the U-shape, and the other-end part of the FFC 44 is connected to the control section.

Provided inside the frame 21 of the image reading device 20 is an unillustrated fixing part for fixing the other-end part of the FFC 44 to the frame 21. The fixing part is, for example, a clip holder, and presses down the FFC 44 inserted between claws of the clip holder. This arrangement fixes the FFC 44 to the frame 21 in a state where a flat surface thereof is in contact with a bottom of an inner side of the frame 21.

FIG. 4 is an enlarged perspective view showing the one-end part of the FFC 44. At the carriage 41 as illustrated in FIG. 4, a resin-made slider 45, which comes into contact with the contact plate 22, is projectedly provided at both end portions of the reading mechanism 43 in its extending direction, i.e., in the main-scanning direction.

FIG. 5 is a sectional view showing the carriage 41, the FFC 44, and the contact plate 22. When the carriage 41 reciprocally moves in the sub-scanning direction, a top end of the slider 45 in an upward direction, in other words, in the Z-direction shown in the drawing, comes into contact with the bottom surface 22A of the contact plate 22, and the slider 45 slides the bottom surface 22A of the contact plate 22. This arrangement keeps a read distance from the bottom surface 22A of the contact plate 22 to the reading mechanism 43 constant at all times.

As described above, because the slider 45 slides the bottom surface 22A of the contact plate 22, the surface of the slider 45 wears as the image reading operation repeats. As a result, a friction coefficient of the slider 45 and the bottom surface 22A of the contact plate 22 increases, and in response to the movement of the carriage 41, sometimes an abnormal noise is generated at a contacting part of the slider 45 and the bottom surface 22A of the contact plate 22.

Furthermore, as the carriage 41 moves in the sub-scanning direction, to be specific, in an X-axis positive direction in the drawing, a substantially U-shaped curved portion 44A of the FFC 44 draws a large circular arc and expands in the upward direction, i.e., in the Z-direction shown in the drawing, and then the carriage 41 comes into contact with the bottom surface 22A of the contact plate 22. There, the contact plate 22 may be stained.

(Fluorine Coating)

In view of the foregoing, according to the image reading device 20 of the one embodiment of the present disclosure, the bottom surface 22A of the contact plate 22 is applied with the fluorine coating. With this arrangement, the friction coefficient of the slider 45 and the contact plate 22 is excellently maintained, and the stain caused by the FFC 44 coming into contact with the contact plate 22 is prevented from being adhered to the contact plate 22. The contact plate 22 is a thin plate-like member made of glass or made of a material containing resin.

FIG. 6 is a plane view showing the contact plate 22 to which the fluorine coating 22B is applied. As illustrated in FIG. 6, the fluorine coating 22B is applied to the bottom surface 22A of the contact plate 22. The fluorine coating treatment may be applied to the contact plate 22 after the bottom surface 22A of the contact plate 22 is applied with plasma treatment.

By applying the fluorine coating 22B to the bottom surface 22A of the contact plate 22, as described above, the friction coefficient of the bottom surface 22A of the contact plate 22 is extremely reduced. Accordingly, the friction coefficient of the slider 45 and the contact plate 22 is reduced, and the occurrence of the abnormal noise, which is generated at the contacting part of the slider 45 and the bottom surface 22A of the contact plate 22, is suppressed.

Additionally, even when the curved portion 44A of the FFC 44 comes into contact with the bottom surface 22A of the contact plate 22, the application of the fluorine coating 22B to the bottom surface 22A of the contact plate 22 gives the bottom surface 22A of the contact plate 22 resistance to stain.

It is unnecessary to apply the fluorine coating 22B an entire bottom surface 22A of the contact plate 22. As illustrated in FIG. 6, the application of the fluorine coating 22B in a belt-like form extending in the sub-scanning direction is only necessary for a region where the slider 45 and the FFC 44 comes into contact with the bottom surface 22A of the contact plate 22. In this way, costs concerning the fluorine coating 22B are reduced.

(Cable Guide Unit)

A cable guide unit may be provided to avoid the FFC 44 from coming into contact with the contact plate 22. Hereinafter details one example in which the image reading device 20 is provided with the cable guide unit.

FIG. 7 is a cross sectional view showing the cable guide unit 50, the carriage 41, the FFC 44, and the contact plate 22 according to the one example. The cable guide unit 50 according to the one example guides the curved portion 44A of the FFC 44 while reciprocally moving in the sub-scanning direction by following the carriage 41 at a speed slower than a moving speed of the carriage 41. Here, the curved portion 44A of the FFC 44 moves along with the move of the carriage. The cable guide unit 50 has a slit 50A extending in the main-scanning direction, i.e., in the Y-direction shown in the drawing, and the curved portion 44A of the FFC 44 is inserted into the slit 50A. This arrangement inhibits, when the carriage 41 moves in the sub-scanning direction, to be specific, in the X-axis positive direction in the drawing, the curved portion 44A of the FFC 44 from drawing the large circular arc and expanding in the upward direction, i.e., in the Z-direction shown in the drawing. Thus, the contact plate 22 is protected from being stained even when the FFC 44 comes into contact with the lower surface 22A of the contact plate 22.

In the technique of forming the recess part that can store the FFC referred to in BACKGROUND, the recess part being capable of storing the FFC must be provided within the frame. Thus, the technique requires a complex frame shape. Additionally, in the technique, a resin-made slider is projectedly provided at both end portions in an extending direction of a carriage and the carriage reciprocally moves while the slider slides a contact plate. Accordingly, as image reading operation repeats, a surface of the slider wears, causing increase in a contacting area between the slider and the contact plate and rise in a friction coefficient. As a result, problems such as increase of a torque load on a motor, which reciprocates the carriage, and the occurrence of the abnormal noise, which is generated at the contacting part of the slider and the contact plate arise. If a lubricant such as grease is applied to the contact plate in order to cope with these problems, another problem arises that the lubricant adheres to other parts of the device at the time of assembly or the friction coefficient varies due to uneven coating of the lubricant.

The image reading device of the present application has its purpose for preventing the contact plate from being stained by the FFC coming into contact with the contact plate.

FIG. 8 is a cross sectional view showing the cable guide unit 50, the carriage 41, the FFC 44, and the contact plate 22 according to another example. The cable guide unit 50 according to this another example is interposed between the curved portion 44A of the FFC 44 and the contact plate 22. Accordingly, the FFC 44 is prevented from coming into contact with the contact plate 22, so that the stain on the contact plate 22 caused by the FFC 44 coming into contact with the contact plate 22 is avoided.

FIG. 9A is a plane view showing an inside of the image reading device 20 when the carriage 41 and the cable guide unit 50 are at a home position. FIG. 9B is a plane view showing the inside of the image reading device 20 when the carriage 41 and the cable guide unit 50 are moving.

The carriage 41 and the cable guide unit 50 are driven by a first timing belt 61 and reciprocally moves in the sub-scanning direction. The first timing belt 61 is a timing belt and endlessly runs between a beginning end and a terminal end in the sub-scanning direction. When the carriage 41 is at the home position, the cable guide unit 50 is at a position right next to the carriage 41. When the carriage 41 is driven by the first timing belt 61 and starts to move in the sub-scanning direction, to be specific, in the X-axis positive direction in the drawing, the cable guide unit 50 follows the carriage 41 at a speed slower than the carriage 41, and moves in the sub-scanning direction. Namely, when the carriage 41 moves for a distance A, the cable guide unit 50 moves for a distance B, which is shorter than the distance A.

The carriage 41 is fixedly install at the first timing belt 61, and moves in the sub-scanning direction along with the move of the first timing belt 61. To drive the cable guide unit 50 by the first timing belt 61, same as the carriage 41, and move the cable guide unit 50 at the speed slower than the carriage 41, a gear mechanism is arranged in the cable guide unit 50.

Figure 10A:
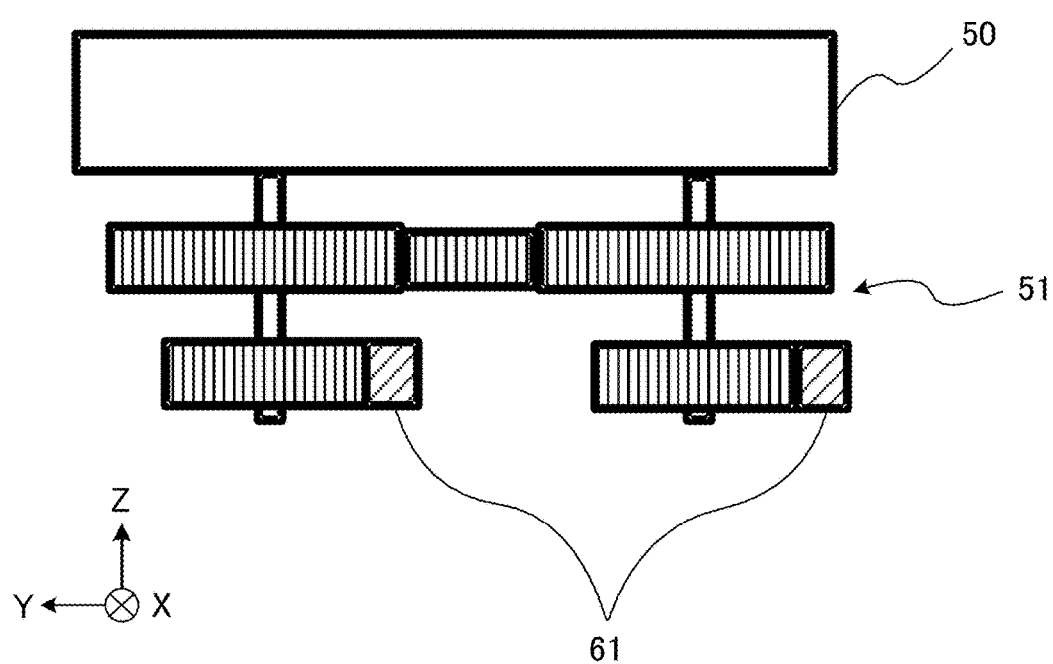
FIG. 10A is a side view when viewed from a sub-scanning direction, showing the cable guide unit that includes a gear mechanism.
Figure 10B:
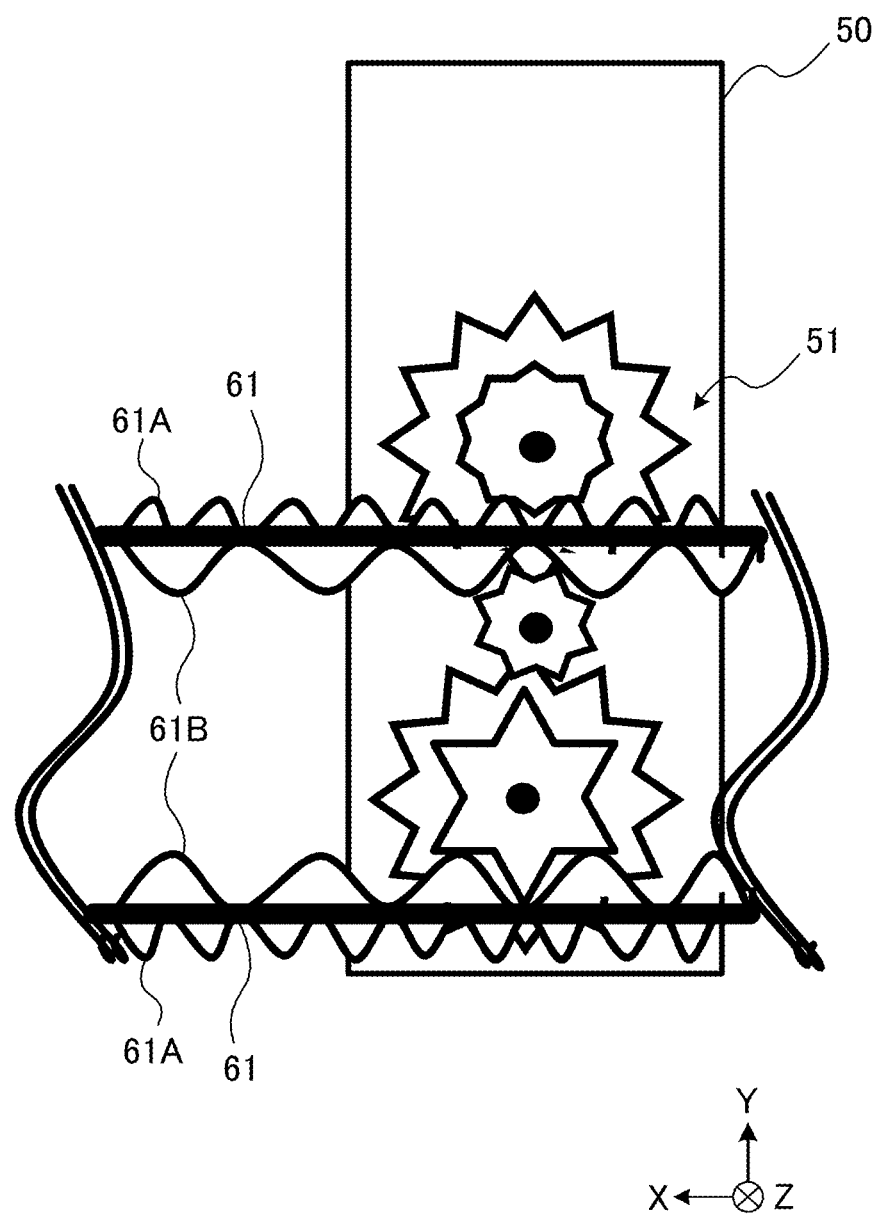
FIG. 10B is a bottom plan view showing the cable guide unit illustrated in FIG. 10A.

FIG. 10A is a side view when viewed from a sub-scanning direction, showing the cable guide unit 50 that includes the gear mechanism 51. FIG. 10B is a bottom plan view showing the cable guide unit 50 illustrated in FIG. 10A. Mutually different number of outer teeth and inner teeth are respectively arranged on an outside periphery and an inside periphery of the first timing belt 61. For example, the number of the inner teeth 61B on the inside periphery is half of that of the outer teeth 61A on the outside periphery of the first timing belt 61. The gear mechanism 51 of the cable guide unit 50 includes a plurality of gears, and these gears mesh with the outer teeth 61A and the inner teeth 61B of the first timing belt 61. The cable guide unit 50 includes: an unillustrated pinion meshing with the gear of the gear mechanism 51 that meshes with the outer teeth 61A; and an unillustrated rack meshing with the pinion. A gear ratio of the gear and the pinion is 1 to 2, so that if the gear takes one turn, the pinion takes half of the turn. The configuration as just described enables the cable guide unit 50 to move at a half speed of a running speed of the first timing belt 61, i.e., at a half speed of the moving speed of the carriage 41. The configuration of the gear mechanism 51 of the cable guide unit 50 is not limited to the configurations illustrated in FIG. 10A and FIG. 10B. It may be configured as to include a gear that meshes with either one of the outer teeth 61A or the inner teeth 61B of the first timing belt 61, and the gear may be configured so as to mesh with the pinion.

A distal end position of the curved portion 44A of the FFC 44, i.e., a folded-back distal end part of the FFC 44, moves at the half speed of the running speed of the carriage 41. Therefore, as described above, by arranging the moving speed of the cable guide unit 50 to be the half speed of the moving speed of the carriage 41, the cable guide unit 50 can be arranged so as to move precisely along with the move of the distal end position of the curved portion 44A of the FFC 44. Accordingly, in the structure illustrated in FIG. 7, the FFC 44 can be guided without the cable guide unit 50 pulling or pushing the FFC 44, namely, without putting loads on the FFC 44. In addition, the cable guide unit 50 can be the smallest size in the structure illustrated in FIG. 8.

For another means for causing the cable guide unit 50 to follow the carriage 41 at the speed slower than the carriage 41, the cable guide unit 50 may be arranged to be driven by a different timing belt.

FIG. 11 is a plane view showing the inside of the image reading device 20 including two timing belts each of which reciprocates the carriage 41 and the cable guide unit 50 respectively. As illustrated in FIG. 11, a second timing belt 62 that reciprocates the cable guide unit 50 in the sub-scanning direction is arranged separately from the first timing belt 61 that reciprocates the carriage 41 in the sub-scanning direction. The second timing belt 62 is tensioned among three pulleys and endlessly runs between the beginning end in the sub-scanning direction and a mid-point in the sub-scanning direction.

Figure 12:
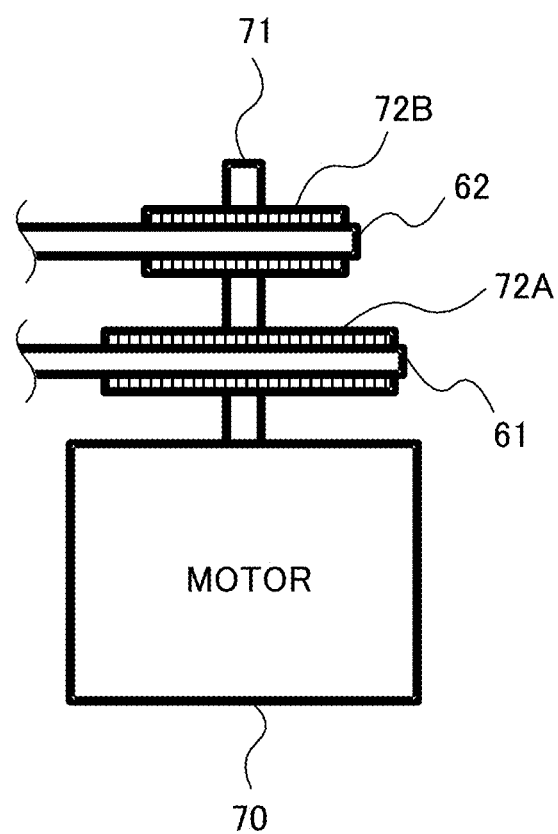
FIG. 12 is a view showing a connection point of the two timing belts and a motor.

The first timing belt 61 and the second timing belt 62 are driven by the same motor. FIG. 12 is a view showing a connection point of the two timing belts (the first timing belt 61 and the second timing belt 62) and a motor 70. A toothed pulley 72A having a large outside diameter and a toothed pulley 72B having a small outside diameter are fixed to a rotation shaft 71 of the motor 70. The first timing belt 61 meshes with the toothed pulley 72A, and the second timing belt 62 meshes with the toothed pulley 72B. According to such the arrangement, the first timing belt 61 and the second timing belt 62 can be driven by a single motor, the motor 70.

Furthermore, by arranging an outer diameter ratio between the toothed pulleys 72A and 72B is set as 2 to 1, a running speed of the second timing belt 62 is set as a half speed of the running speed of the first timing belt 61. Accordingly, in the structure illustrated in FIG. 7, the FFC 44 can be guided without the cable guide unit 50 pulling or pushing the FFC 44, namely, without putting loads on the FFC 44. In addition, the cable guide unit 50 can be the smallest size in the structure illustrated in FIG. 8.

By arranging the two timing belts (the first timing belt 61 and the second timing belt 62) and driving these two timing belts by the same motor, the motor 70, as described above, when the carriage 41 is driven by the first timing belt 61 and starts to move in the sub-scanning direction, to be specific, in the X-axis positive direction in the drawing, the cable guide unit 50 is driven by the second timing belt 62 and follows the carriage 41 at the speed slower than the carriage 41 and moves in the sub-scanning direction. That is, when the carriage 41 moves for a distance A, the cable guide unit 50 moves for a distance B, which is shorter than the distance A.

As described thus far, according to the present embodiment, the application of the fluorine coating 22B to the bottom surface 22A of the contact plate 22 in the image reading device 20 can prevent: the occurrence of the stain on the contact plate 22 caused by the FFC 44 coming into contact with the contact plate 22; and the occurrence of the abnormal noise, which is generated at the contacting part of the slider 45 and the bottom surface 22A of the contact plate 22 and is caused by the wear of the slider 45 that slides the bottom surface 22A of the contact plate 22. Furthermore, by providing the cable guide unit 50, the FFC 44 is prevented from coming into contact with the contact plate 22.

As a matter of course, the disclosure may be modified in various manners without limitation to the foregoing embodiment. For example, although the case of providing the cable guide unit 50 to prevent the FFC 44 from coming into contact with the contact plate 22 is detailed in the foregoing embodiment, instead, an arrangement of providing a tension member that hooks the curved portion 44A of the FFC 44, which moves along the carriage 41, from the inside and pulls the curved portion 44A toward the curve may be made.

Further, the configurations of the embodiment described with reference to FIG. 1 to FIG. 12 are merely exemplary, and not intended to limit the scope of the disclosure.

Various modifications and alterations of this disclosure will be apparent to those skilled in the art without departing from the scope and spirit of this disclosure, and it should be understood that this disclosure is not limited to the illustrative embodiment set forth herein.

What is claimed is:

1. An image reading device comprising:
a contact plate on which a document to be read is placed;
a box-shaped frame that supports the contact plate;
a carriage that includes a reading mechanism extending in a main-scanning direction and reciprocally moves in a sub-scanning direction at a side of a bottom surface of the contact plate in the frame, the bottom surface being an opposite side from a top surface on which the document is placed;
a flexible flat cable that transmits an electric signal of the reading mechanism, the flexible flat cable being connected to an one side surface of the carriage so that a width direction thereof matches the main-scanning direction, and being arranged so that a part continued from a portion where the flexible flat cable connects with the one side surface is curved in a U-shape to go around toward an underside of the carriage; and
a cable guide unit that guides a U-shaped curved portion of the flexible flat cable and avoids the flexible flat cable from coming into contact with the contact plate while reciprocally moving in the sub-scanning direction by following the carriage at a speed slower than a moving speed of the carriage, the U-shaped curved portion moving along with a move of the carriage.

2. The image reading device according to claim 1, further comprising a timing belt that endlessly runs between a beginning end and a terminal end in the sub-scanning direction and reciprocates the carriage in the sub-scanning direction, wherein
mutually different number of outer teeth and inner teeth are respectively arranged on an outside periphery of the timing belt and on an inside periphery of the timing belt, and
the cable guide unit has a gear mechanism in which a plurality of gears meshes with the outer teeth and the inner teeth of the timing belt, and the gear mechanism causes the cable guide unit to move in the sub-scanning direction at a speed slower than a running speed of the timing belt.

3. The image reading device according to claim 1, further comprising:
a first timing belt that endlessly runs between a beginning end and a terminal end in the sub-scanning direction and reciprocates the carriage in the sub-scanning direction;
a second timing belt that endlessly runs between the beginning end in the sub-scanning direction and a mid-point in the sub-scanning direction and reciprocates the cable guide unit in the sub-scanning direction; and
a motor that drives the first timing belt and the second timing belt, wherein
a first toothed pulley having a large outside diameter and a second toothed pulley having a small outside diameter are fixed to a rotation shaft of the motor, and
the first timing belt meshes with the first toothed pulley and the second timing belt meshes with the second toothed pulley.

4. The image reading device according to claim 1, wherein
the cable guide unit has a slit extending in the main-scanning direction,
the U-shaped curved portion of the flexible flat cable is inserted into the slit, and
the cable guide unit moves at a half speed of the moving speed of the carriage.

5. The image reading device according to claim 1, wherein the cable guide unit is interposed between the U-shaped curved portion of the flexible flat cable and the contact plate.

6. The image reading device according to claim 3, wherein an outer diameter ratio between the first toothed pulley and the second toothed pulley is set as 2 to 1.

7. An image reading device comprising:
a contact plate on which a document to be read is placed;
a box-shaped frame that supports the contact plate;
a carriage that includes a reading mechanism extending in a main-scanning direction and a resin-made slider projectedly provided at both end portions of the reading mechanism in an extending direction thereof and, while the slider slides a bottom surface of the contact plate in the frame, reciprocally moves in a sub-scanning direction at a side of the bottom surface, the bottom surface being an opposite side from a top surface on which the document is placed; and
a flexible flat cable that transmits an electric signal of the reading mechanism, the flexible flat cable being connected to an one side surface of the carriage so that a width direction thereof matches the main-scanning direction, and being arranged so that a part continued from a portion where the flexible flat cable connects with the one side surface is curved in a U-shape to go around toward an underside of the carriage,
wherein the bottom surface of the contact plate is applied with a fluorine coating, and
the flexible flat cable is so arranged: that a one-end part of the flexible flat cable is connected to the one side surface of the carriage; as to extend to a direction away from the carriage with the one-end part as a starting point, to be curved in the U-shape, then to be extended in a reverse direction to go around toward the underside of the carriage, and to be further reversed in a folded state at a position opposing, with the carriage in between, from a position where the flexible flat cable is curved in the U-shape; and that an other-end part of the flexible flat cable is connected to a control section that controls reading operation.

* * * * *